United States Patent [19]
Ohki Mitsuharu

[11] Patent Number: 5,227,994
[45] Date of Patent: Jul. 13, 1993

[54] INNER PRODUCT CALCULATING CIRCUIT
[75] Inventor: Ohki Mitsuharu, Tokyo, Japan
[73] Assignee: Sony Corporation, Tokyo, Japan
[21] Appl. No.: 808,649
[22] Filed: Dec. 17, 1991
[30] Foreign Application Priority Data
Dec. 28, 1990 [JP] Japan ................... 2-417121
[51] Int. Cl.$^5$ ................................. G06F 7/38
[52] U.S. Cl. ................................. 364/750.5
[58] Field of Search .............. 364/718, 723, 724.1, 364/724.16, 724.19, 736, 750.5, 754, 758, 728.05

[56] References Cited
U.S. PATENT DOCUMENTS

| | | | |
|---|---|---|---|
| 4,493,048 | 1/1985 | Kung et al. | 364/754 |
| 4,622,650 | 11/1986 | Kulisch | 364/748 |
| 4,866,653 | 9/1989 | Kulisch et al. | 364/748 |
| 4,884,232 | 11/1989 | Schlunt | 364/754 |
| 4,914,615 | 4/1990 | Karmarkar et al. | 364/754 |
| 5,032,865 | 7/1991 | Schlunt | 364/750.5 |

Primary Examiner—Jerry Smith
Assistant Examiner—Chuong D. Ngo
Attorney, Agent, or Firm—William S. Frommer; Alvin Sinderbrand

[57] ABSTRACT

An inner product calculating circuit is provided to calculate an inner product of a constant vector and an input vector, where both of the vectors consist of m respective elements (m being an integer, m>2), the elements of the constant vector can be expressed as the sum and difference of I weighted coefficients (I being an integer, I<m), and the weights applied to the I coefficients are selected from the group consisting of 0 and powers of 2. This inner product calculating circuit is comprised of adder-subtracter circuits for adding respective elements of the input vector with weights of the coefficients extracted from all elements of the constant vector, and multiplying circuits for multiplying outputs of the adder-subtracters with the respective coefficients.

5 Claims, 5 Drawing Sheets

INNER PRODUCT CALCULATING CIRCUIT

BACKGROUND OF THE INVENTION

1. Field of the Invention

The present invention generally relates to data processing apparatus and, more particularly, is directed to an inner product calculating circuit suitable for use in a calculating circuit which calculates an inner product of a constant vector and an arbitrary input vector, for example.

2. Description of the Prior Art

While a product of a constant matrix and an arbitrary input vector must be calculated in a discrete cosine transform (DCT), a discrete Fourier transform (DFT) or the like (see Japanese Laid-Open Patent Publication No. 62-61159), a product of a constant matrix of m lines×m columns (m is an integer larger than 2) and an m-dimensional input vector, for example, can be obtained by calculating an inner product of m-dimensional constant vector and m-dimensional arbitrary vector m times. In general, an m-dimensional constant vector is represented as $<dj>$ (j=0, 1, ... ) and m elements of this constant vector are represented as dj,k (k=0, 1, ..., m−1). Also, assuming that an m-dimensional arbitrary vector is represented as $<xj>$ and that m elements of this arbitrary vector are represented as xj,k, then vectors $<dj>$ and $<xj>$ are expressed by the following equation (1):

$$<dj> = \begin{pmatrix} dj,0 \\ dj,1 \\ \vdots \\ dj,m-1 \end{pmatrix}, <xj> = \begin{pmatrix} xj,0 \\ xj,1 \\ \vdots \\ xj,m-1 \end{pmatrix} \quad (1)$$

In this case, let us assume an inner product calculating circuit in which an inner product $<d0>\cdot<x0>$ is calculated at timing point t0, an inner product $<d1>\cdot<x1>$ is calculated at timing point t1 in the same manner and inner products $<dj>\cdot<xj>$ are sequentially calculated.

FIG. 1 shows a conventional inner product calculating circuit utilized for the above-mentioned purpose where m=8. In FIG. 1, reference symbols 1A through 1H depict the same multiplying units, respectively and these multiplying units 1A to 1H are respectively supplied with eight-dimensional arbitrary input vector elements I0 to I7. More specifically, the multiplying unit 1A is composed of a multiplier 2 and a coefficient memory 3 which sequentially supplies a first element of a series of constant vectors to one input portion of the multiplier 2. The multiplier 2 is supplied at the other input portion thereof with the first element I0 and the multiplier 2 derives at its output portion a product of the first element I0 and the element supplied thereto from the coefficient memory 3.

Similarly, the multiplying units 1B to 1H derive products of input vector elements and elements supplied thereto from the coefficient memories, and the calculated result, which is provided by adding the outputs of these multiplying units 1A to 1H by using adders 4A to 4G, is produced as the output of the whole inner product calculating circuit shown in FIG. 1. For example, assuming that the input elements I0 to I7 are eight elements of eight dimensional input vectors $<xj>$ and that eight elements of the constant vector $<dj>$ are supplied from the eight coefficient memories to the corresponding adders, then the inner product calculating circuit derives an output yj which is an inner product of the vector $<xj>$ and the vector $<dj>$. Generally, when the inner product of the m-dimensional arbitrary vector and the m-dimensional constant vector is obtained by inputting all elements of the arbitrary vector in parallel with one another, then the conventional inner product calculating circuit needs m multipliers.

However, it is frequently observed that the kind of coefficients involved in the transform matrix is less than the number of lines or columns in the DCT calculation, the DFT calculation or the like and that the kind of the elements of the constant vector is less than the number of dimension accordingly. From this viewpoint, it can be expected that the number of multipliers used in the inner product calculating circuit which calculates the inner product of such constant vector and arbitrary vector can be reduced.

OBJECTS AND SUMMARY OF THE INVENTION

Accordingly, it is an object of the present invention to provide an improved inner product calculating circuit.

More specifically, it is an object of the present invention to provide an inner product calculating circuit which can reduce the number of multipliers used therein.

It is another object of the present invention to provide an inner product calculating circuit in which an inner product of m-dimension vectors can be calculated using less than m multiplying circuits.

It is a further object of the present invention to provide an inner product calculating circuit in which an inner product can be calculated without additionally providing a multiplier even when weights of coefficients for generating respective elements of constant vector are two's power.

As an aspect of the present invention, an inner product calculating circuit is provided to calculate an inner product of a constant vector and an input vector, where both of the vectors consist of m respective elements (m being an integer, m>2), the elements of the constant vector can be expressed as the sum and difference of I weighted coefficients (I being an integer, I<m), and the weights applied to the I coefficients are selected from the group consisting of 0 and powers of 2. This inner product calculating circuit is comprised of adder-subtracter circuits for adding respective elements of the input vector with weights of the respective coefficients extracted from all elements of the constant vector, and multiplying circuits for multiplying outputs of the adder-subtracters with the respective coefficients.

BRIEF DESCRIPTION OF THE DRAWINGS

A better understanding of the objects, features, and advantages of the invention can be gained from a consideration of the following detailed description of the preferred embodiments thereof, in conjunction with the figures of the accompanying drawings, wherein.

DETAILED DESCRIPTION OF THE PREFERRED EMBODIMENTS

Before describing the preferred embodiment of the invention, let us describe characteristics of a constant vector that the invention intends to calculate the inner product thereof.

Now, assuming that the constant vector is represented as vector $<dj>$ and that the number of dimension thereof is represented as m, then the vector $<dj>$ can be expressed by the equation (1) as earlier noted. Further, according to the present invention, it is assumed that m elements $dj,k$ of the vector $<dj>$ can be expressed in the form of a linear combination of I independent coefficients $ai$ ($i=1, 2, \ldots, I$) where I is smaller than m by the following equation (2):

$$dj,k = \sum_{i=1}^{I} ej,k,i \cdot ai \quad (2)$$

In the equation (2), the value of weights $ej, k, i$ of the coefficients $ai$ might be either 0 or $\pm 2^q$ and q is an integer.

The first embodiment of the present invention will now be described with reference to FIGS. 2 and 3. In this embodiment, the present invention is applied to the case such that m, which is the number of dimension of the vector, is 8 and that the kind of the coefficients $ai$ for generating the respective elements of the constant vector $<dj>$ is 3 ($I=3$). Further, the value of the weights $ej, k, i$ of the coefficient $ai$ is only 0 or $\pm 1$ and the three kinds of coefficients $ai$ are assumed to be a, b and c. That is, respective elements $dj, k$ ($k=0, 1, \ldots, 7$) of the constant vector $<dj>$ can be expressed as follows:

$$\begin{aligned} dj,k &= ej,k,1 a + ej,k,2 b + ej,k,3 c \\ &= (0 \text{ or } \pm a) + (0 \text{ or } \pm b) + (0 \text{ or } \pm c) \end{aligned}$$

In this case, arbitrary 8-dimensional vector corresponding to the constant vector $<dj>$ is selected to be $<xj>$ and elements of this vector $<xj>$ are selected to be $xj,k$ ($k=0, 1, \ldots, 7$). Then, assuming that $yj$ represents the inner product of the vector $<dj>$ and the vector $<xj>$, then the inner product $yj$ can be expressed by the following equation (3):

$$\begin{aligned} yj &= <dj> \cdot <xj> \\ &= a\left(\sum_{k=0}^{7} ej,k,1 \cdot xj,k\right) + \\ &\quad b\left(\sum_{k=0}^{7} ej,k,2 \cdot xj,k\right) + \\ &\quad c\left(\sum_{k=0}^{7} ej,k,3 \cdot xj,k\right) \end{aligned} \quad (3)$$

Since the weights $ej,k,i$ are all 0 or $\pm 1$, numerical values respectively multiplied with the coefficients a, b, c in the equation (3) can be obtained with ease by the addition and subtraction of 8 elements of the vector $<xj>$.

Figure 1:
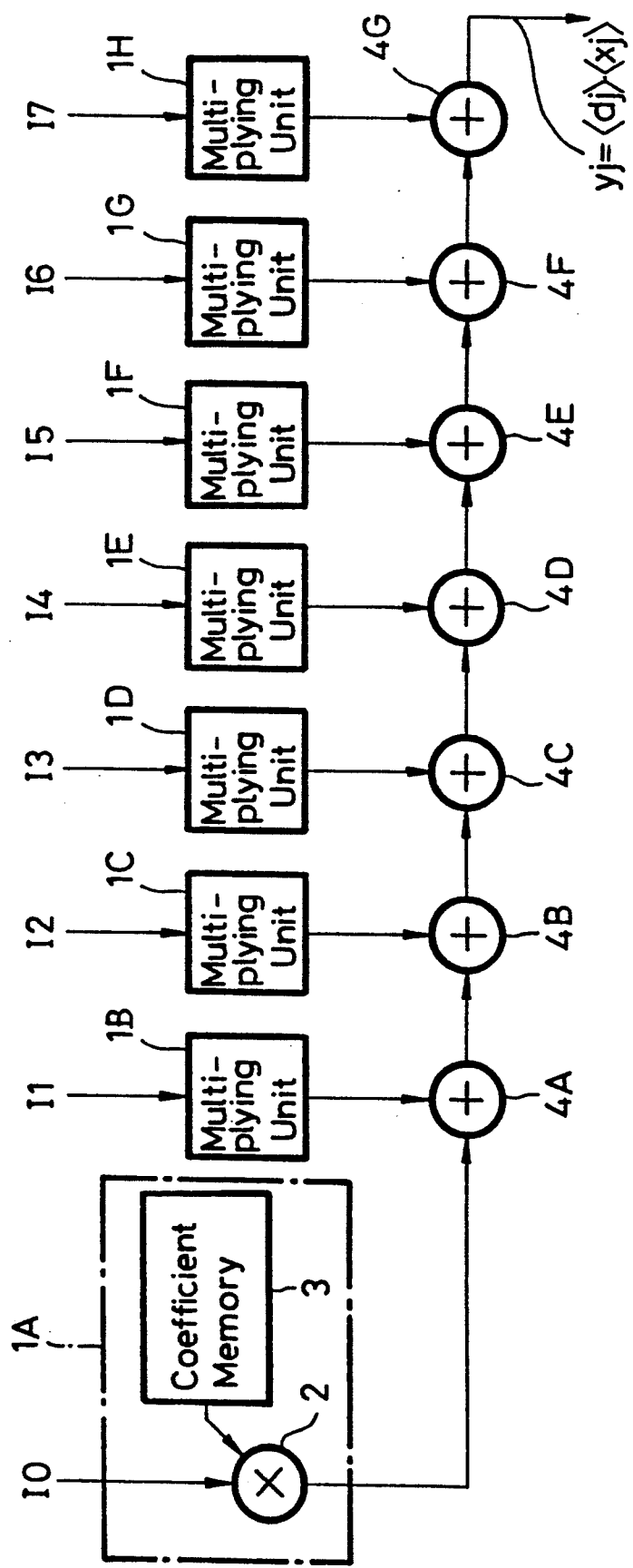
FIG. 1 shows in block form an example of an inner product calculating circuit according to the prior art.
Figure 2:
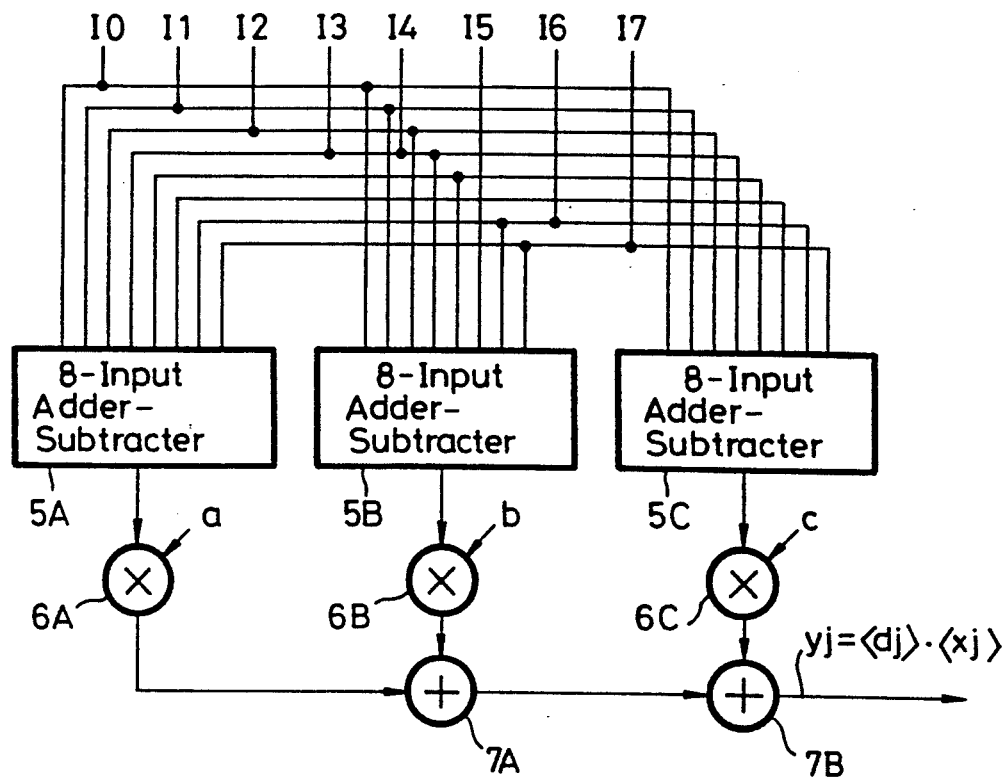
FIG. 2 shows a block diagram of a first embodiment of an inner product calculating circuit according to the present invention.
Figure 3:
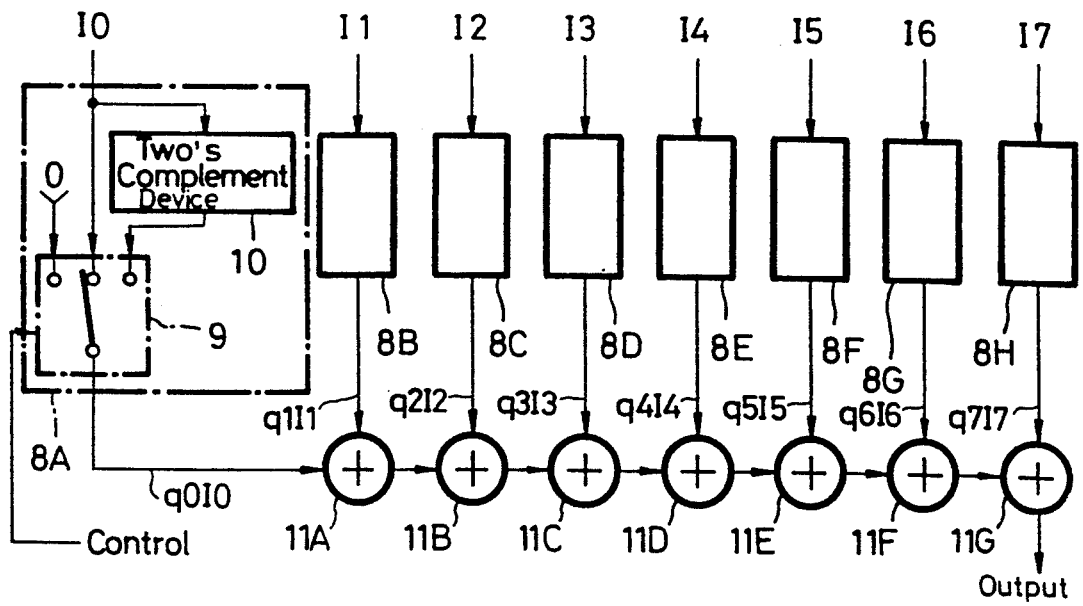
FIG. 3 shows a block diagram of an example of an 8-input adder-subtracter used in the first embodiment of the present invention.

FIG. 2 shows in block form an inner product calculating circuit of this embodiment which executes the calculation shown in the equation (3). In FIG. 2, reference symbols 5A to 5C depict 8-input and 1-output adder-subtracters, respectively, and 8 input data I0 to I7 are commonly supplied to these adder and subtracters 5A to 5C.

An example of an arrangement of the 8-input and 1-output adder-subtracter of the present invention will now be described with reference to FIG. 3. In FIG. 3, reference numeral 8A depicts a conversion unit and conversion units 8A to 8H of the same configuration are provided for 8 input units. The input data I0, I1, ... I7 are respectively supplied to these conversion units 8A to 8H. For simplicity, only one conversion unit 8A on the left-hand end will be described more fully below. In the conversion unit 8A, reference numeral 9 depicts a 3-input and 1-output data selector. Input data I0 of the left end is supplied through a two's complement device 10 and is directly supplied to first and second input portions of the data selector 9, and data of value 0 is supplied to a third input portion of the data selector 9. Then, the data selector 9 selects data in response to the control signal supplied thereto from the outside, whereby the conversion unit 8A at the left end derives I0, $-$I0 or 0.

Similarly, the individual conversion units 8B to 8H output $Ii$, $-Ii$ or 0 ($i=1, 2, \ldots, 7$) in response to the control signal. Results, which are obtained by accumulatively adding output data of the eight conversion units 8A to 8H by seven accumulative adders 11A to 11G, become final output data of the subtracter-adder. That is, the 8-input adder-subtracter outputs $$q0I0+q1I1+ \ldots +qn-1In-1$$

for the input data I0 to In$-$1, and values of respective data $qi$ can be arbitrary designated from 0, 1 or $-1$. Accordingly, if 8 elements of vector $<xj>$ are supplied to the 8-input adder-subtracters 5A, 5B and 5C of FIG. 2 as input data, the 8-input adder-subtracters 5A, 5B and 5C can obtain multipliers to be multiplied with the coefficients a, b and c respectively defined by the equation (3).

Referring back to FIG. 2, multipliers 6A, 6B and 6C are adapted to multiply input data with the coefficients a, b and c, respectively, and output data of the adder-subtracters 5A to 5C are respectively supplied to the multipliers 6A to 6C. Output data of the multipliers 6A and 6B are respectively supplied to one and the other input portions of an adder 7A, and output data of the adder 7A and output data of the multiplier 6C are respectively supplied to one and the other input portions of an adder 7B. This last adder 78B derives an inner product yi defined by the equation (3).

Figure 4:
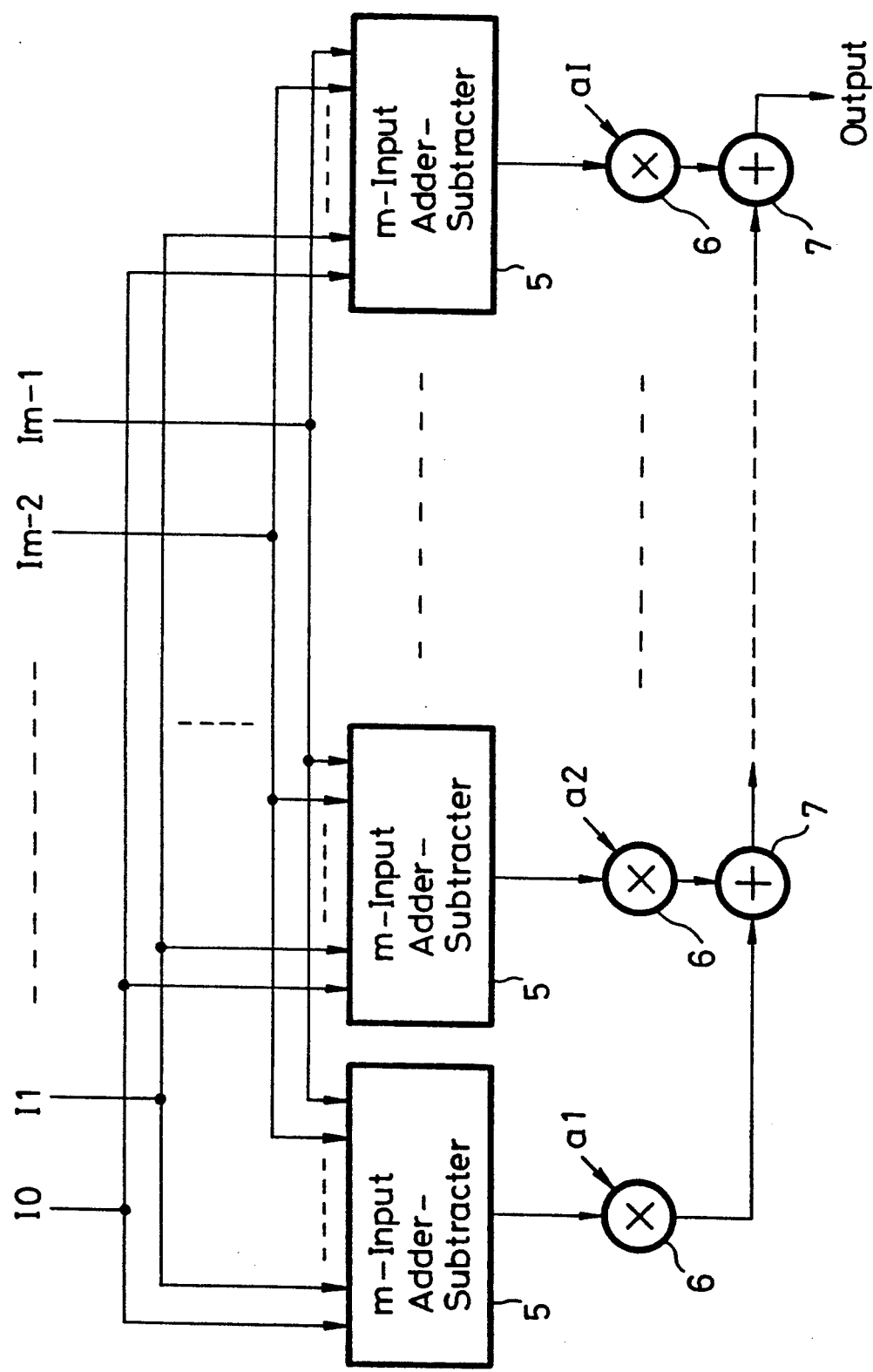
FIG. 4 shows in block form an example of a circuit which generalizes the first embodiment of the present invention.

Now, let us consider that the circuit of FIG. 2 is generalized. In order to generalize the circuit of FIG. 2, m assumes a dimension of a vector whose inner product should be calculated and I (I<m) assumes the number of independent coefficients ai which generate respective elements of the constant vector <dj>. In this case, the circuit of FIG. 2 is generalized as a circuit shown in FIG. 4. In FIG. 4, reference numerals 5 each depict an m-input and one-output adder-subtracter to which m input data are supplied, reference numerals 6 each depict a multiplier and reference numerals 7 each depict an adder. In this embodiment, I adder-subtracters 5, and I multipliers 6 are provided and also (I−1) adders are provided. Output data of the adder-subtracters 5 are respectively supplied to the corresponding multipliers 6 and the multipliers 6 respectively multiply input data with coefficients a1, a2, . . . , aI. An inner product is obtained by adding multiplied results of I multipliers 6 by (I−1) adders 7.

As described above, according to this embodiment, in the circuit configuration to which m elements of input vector are input in parallel, the inner product of m-dimension vectors can be obtained only by utilizing I multipliers 6 whose number is less than m. There is then the advantage that the overall circuit scale can be miniaturized substantially in proportion to the number of the multipliers.

A second embodiment of the present invention will be described with reference to FIGS. 5 to 7. Also in this embodiment, the present invention is applied to the case such that the number m of dimension of the vector is 8 and that the kind of coefficient ai for generating respective elements of the constant vector <dj> is 3 (I=3). In this embodiment, however, the value of weights ej, k, i of the coefficient ai falls in a wide range of values 0 or $\pm 2^q$ (q is an integer), and the three kinds of coefficients ai are represented as a, b and c, respectively. That is, elements dj, k (k=0, 1, . . . , 7) of the constant vector <dj> can be respectively expressed by using three integers q1, q2 and q3 as follows:

$$dj,k = ej,k,1a + ej,k,2b + ej,k,3c$$
$$= (0 \text{ or } \pm 2^{q_1}a) + (0 \text{ or } \pm 2^{q_2}b) + (0 \text{ or } \pm 2^{q_3}c)$$

In this case, although the inner product of the constant vector <dj> and arbitrary vector <xj> can be expressed by the foregoing equation (3), in this embodiment, the weights ej, k, i can take values of a wide range from 0 or $\pm 2^q$.

Figure 5:
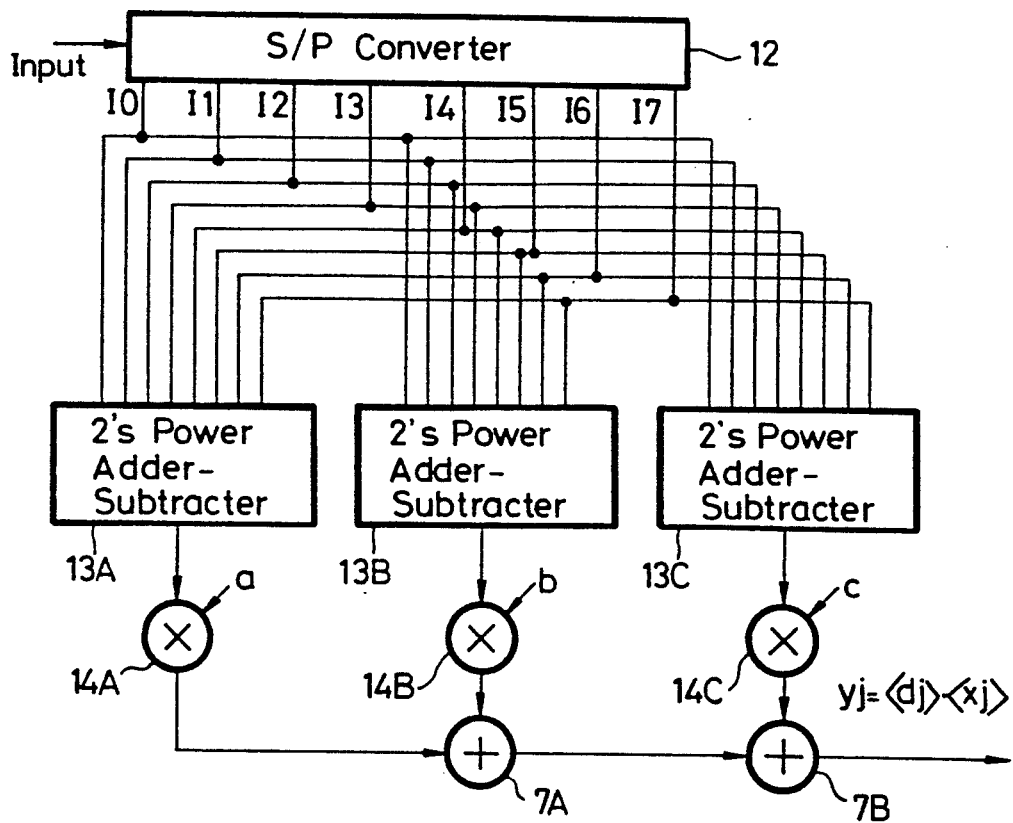
FIG. 5 shows a block diagram of a second embodiment of the inner product calculating circuit according to the present invention.
Figure 6:
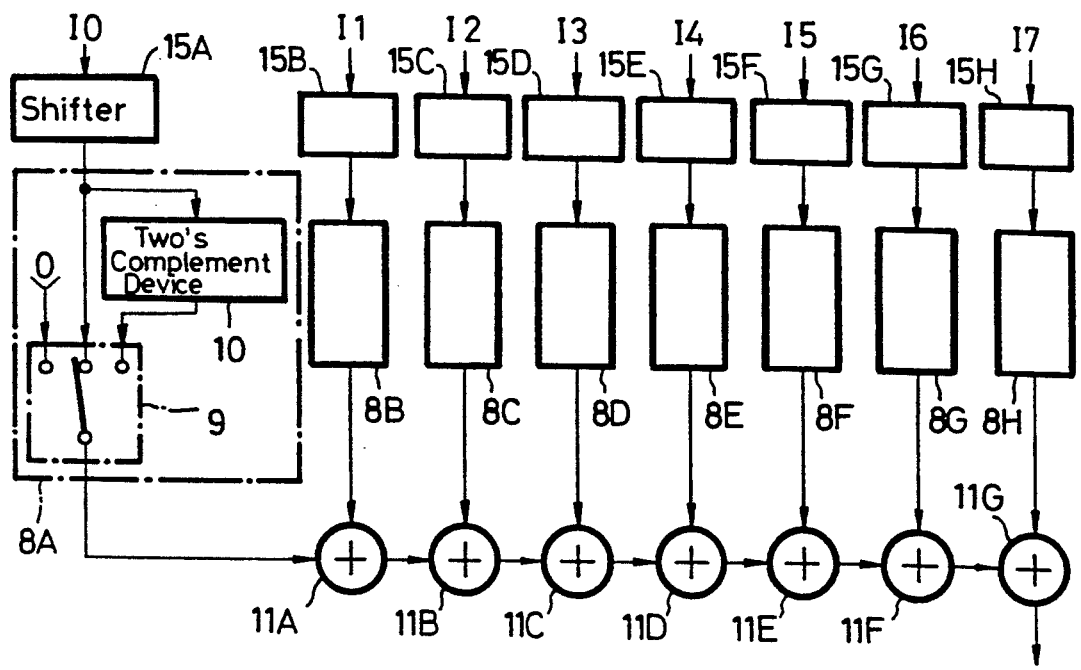
FIG. 6 shows a block diagram of an example of an 8-input adder-subtracter of 2's power used in the second embodiment of the present invention.

FIG. 5 shows the second embodiment of the generalized inner product calculating circuit which executes the calculation shown in the foregoing equation (3).

In FIG. 5, reference numeral 12 designates a serial-to-parallel (S/P) converter. The S/P converter 12 is adapted to convert eight elements I0 to I7 of an input vector serially input thereto into parallel data, and this S/P converter 12 may be removed. Reference numerals 13A through 13C designate two's power adder-subtracters to which the above eight parallel data are supplied, respectively.

An example of the arrangement of each of the two's power adder-subtracter will be described with reference to FIG. 6. In FIG. 6, reference numerals 15A through 15H respectively designate shifters which can shift the input data by a desired bit, and eight input data I0 to I7 are respectively supplied through the shifters 15A through 15H to the conversion units 8A through 8H. A rest of the circuit configuration of FIG. 6 is the same as that of FIG. 3 and therefore need not be described. The shifters 15A through 15H are provided in the circuit of FIG. 6 so that, if the weights ej, k, i, for example, are two's powers in the calculation of in the equation (3), then the input data is shifted to the upper digit or lower digit by a predetermined bit by the first shifter 15A, the numbers of two's power being multiplied.

Referring back to FIG. 5, output data of the two's power adder-subtracters 13A to 13C are respectively supplied to the multipliers 14A to 14C, in which the input data are respectively multiplied with the coefficients a, b and c by the multipliers 14A to 14C. Output data of the multipliers 14A and 14B are respectively supplied to one and the other input portions of the adder 7A, and output data of the adder 7A and output data of the multiplier 14C are respectively supplied to one and the other input portions of the adder 7B. The last adder 7B derives the inner product yi defined by the generalized equation (3).

Let it be considered that the circuit of FIG. 5 is generalized. In order to generalize the circuit of FIG. 5, m assumes the dimension of vector whose inner product should be calculated and I (I<m) assumes the number of independent coefficients which generate respective elements of the constant vector <dj>. In that case, the circuit of FIG. 5 is generalized as a circuit shown in FIG. 7.

Figure 7:
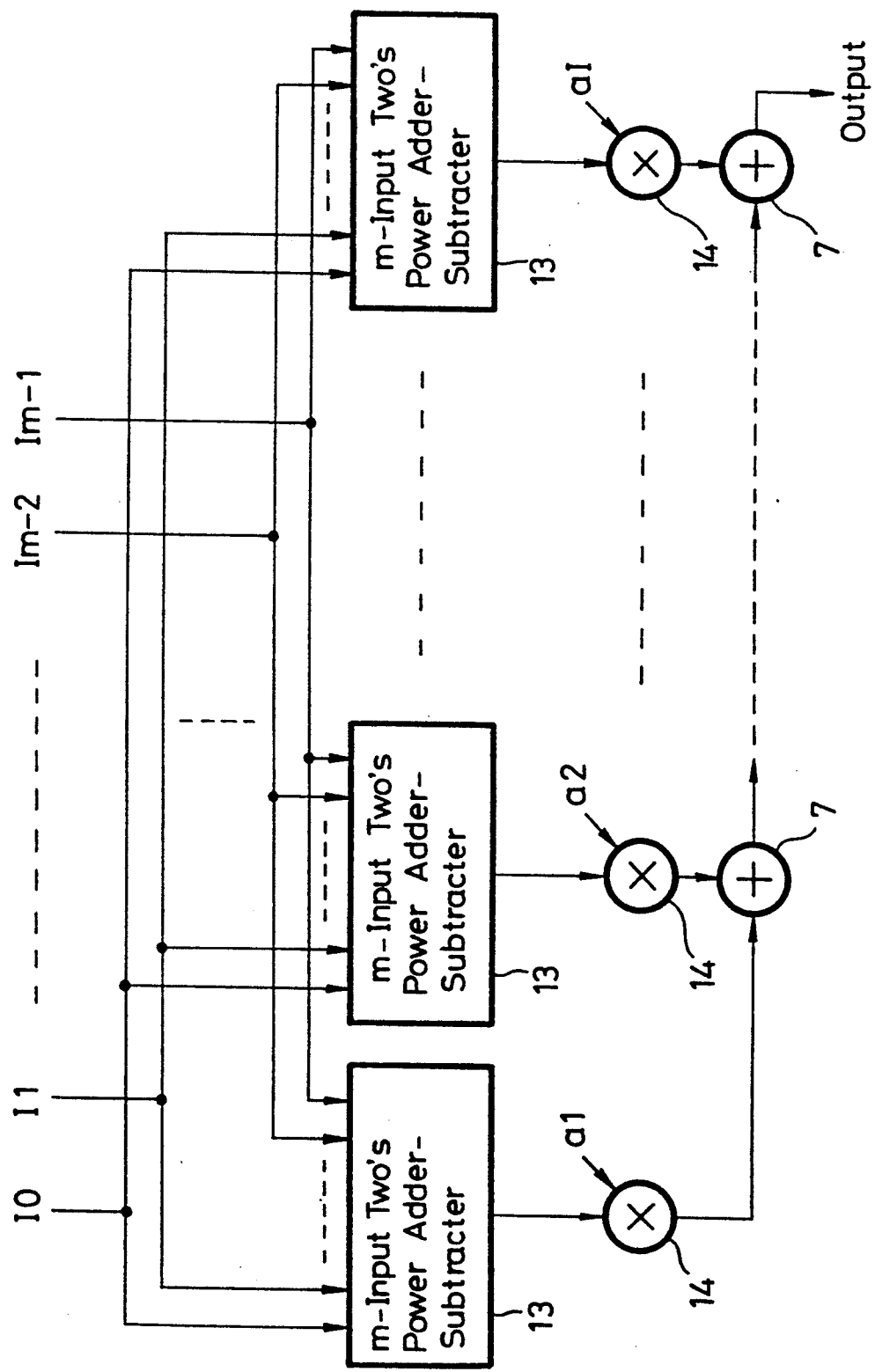
FIG. 7 shows a block diagram of an example of a circuit which generalizes the second embodiment of the present invention.

In FIG. 7, reference numerals 13 each depicts an m-input and one-output two's power adder-subtracter to which m input data are supplied, 14 a multiplier and 7 an adder. As shown in FIG. 7, there are provided I adder-subtracters 13 and I multipliers 14 and (I−1) adders 7. Output data of the adder-subtracters 13 are respectively supplied to corresponding multipliers 14, and the multipliers 14 respectively multiply the input data with coefficients a1, a2, . . . , aI. An inner products is obtained by adding multiplied results of the I multipliers 14 by the (I−1) adders 7.

As described above, according to this embodiment, in the circuit configuration to which the m elements of the input vector are input in parallel, the inner products of the m-dimension vectors can be obtained only by utilizing I's multipliers 14 whose where I is less than m. Further, in this embodiment, since the two's power adder-subtracters 13 each having the shifter are provided, even when the weights ej, k, i of the coefficients which generate respective elements of the constant vector are two's power, the inner product can be obtained without additionally providing the multiplier.

According to the present invention, when respective elements of the first vector of m-dimension are obtained by weighting and adding the coefficients of less than m by 0 or the number of two's power and adding the same, terms of the same coefficient are previously added, subtracted or shifted. There is then the advantage that the inner product of the first vector and the arbitrary second vector can be calculated by the multiplying circuits whose number is less than m.

Although the preferred embodiments of the invention have been described herein with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. An inner product calculating circuit for calculating an inner product of a constant vector and an input vector, each said vector consisting of m respective elements where m is an integer greater than 2, wherein each of said elements of said constant vector can be expressed as the sum and difference of weighted coefficients, said coefficients consisting of fewer than m coefficients, said coefficients being weighted by weights selected from the group consisting of 0 and powers of 2, said circuit comprising:
   a plurality of adder-subtracter circuits for weighting respective elements of said input vector with weights of respective ones of said coefficients extracted from corresponding elements of said constant vector and for adding and subtracting said weighted elements of said input vector to form respective outputs;
   a like plurality of multiplying circuits for multiplying said outputs of said adder-subtracter circuits with said respective coefficients; and
   a plurality of adders for adding outputs of said multiplying circuits, said plurality of adders consisting of fewer adders than the number of said multiplying circuits.

2. An inner product calculating circuit as claimed in claim 1, in which each of said adder-subtracter circuits comprises a plurality of conversion units and a plurality of adders for adding outputs of said conversion units, said plurality of adders consisting of fewer adders than the number of said conversion units.

3. An inner product calculating circuit as claimed in claim 2, in which each of said conversion units is formed of a 3-input and 1-output data selector and a two's complement device having an output connected to an input of said data selector.

4. An inner product calculating circuit as claimed in claim 1, in which each of said adder-subtracter circuits comprises a plurality of shifters, a like plurality of conversion units each having an input connected to an output of a respective one of said shifters, and a plurality of adders for adding outputs of said conversion units, said plurality of adders consisting of fewer adders than the number of said conversion units.

5. An inner product calculating circuit as claimed in claim 4, in which each of said conversion units is formed of a 3-input and 1-output data selector and a two's complement device having an output connected to an input of said data selector.

* * * * *